United States Patent [19]

Schneider et al.

[11] Patent Number: 4,585,632

[45] Date of Patent: Apr. 29, 1986

[54] PROCESS FOR THE REMOVAL OF NITROGEN OXIDES FROM EXHAUST GASES

[75] Inventors: Michael Schneider, Ottobrunn Riemerling; Karel Kochloefl, Moosburg, both of Fed. Rep. of Germany

[73] Assignee: Süd-Chemie Aktiengesellschaft, Munich, Fed. Rep. of Germany

[21] Appl. No.: 682,094

[22] Filed: Dec. 14, 1984

[30] Foreign Application Priority Data

Dec. 16, 1983 [DE] Fed. Rep. of Germany ....... 3345675
Jul. 31, 1984 [DE] Fed. Rep. of Germany ....... 3428231

[51] Int. Cl.⁴ .......................... B01J 8/00; C01B 21/00
[52] U.S. Cl. ................................................... 423/239
[58] Field of Search ................. 423/235, 235 D, 239, 423/239 A

[56] References Cited

FOREIGN PATENT DOCUMENTS 52-20971 8/1977 Japan ................................. 423/239
53-79762 2/1978 Japan ................................. 423/239

Primary Examiner—Gregory A. Heller
Attorney, Agent, or Firm—William R. Price

[57] ABSTRACT

Process for the removal of nitrogen oxides from exhaust gases, in particular from exhaust gases containing sulfur oxides, by catalytic reduction. As a reduction agent a gas mixture obtained by catalytic conversion of methanol either by catalytic dissociation or by steam reforming is mixed with the exhaust gases and passed over a catalyst, wherein the nitrogen oxides are reduced to nitrogen. According to the first variant, one operates with conventional catalysts above 300° C., according to the second variant, with new catalysts below 300° C.

21 Claims, 1 Drawing Figure

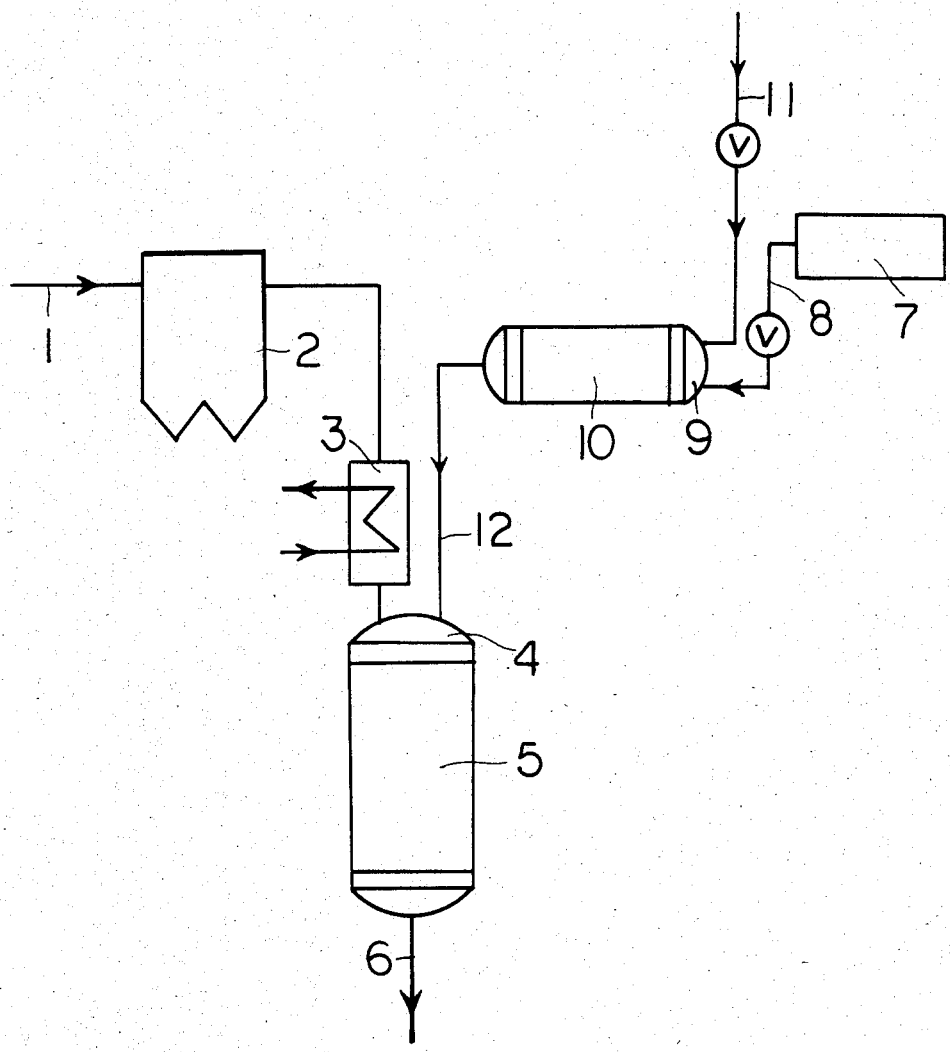

PROCESS FOR THE REMOVAL OF NITROGEN OXIDES FROM EXHAUST GASES

FIELD OF THE INVENTION

The invention relates to a process for the removal of nitrogen oxides from exhaust gases, in particular from exhaust gases containing sulfur oxides, by catalytic reduction.

Exhaust gases, according to this invention, include the waste gases of furnace installations, e.g. of power plants, boiler installations, the exhaust gases of engines and turbines, as well as the exhaust gases of chemical plants and of metal pickling factories The term nitrogen oxides, according to this invention, includes NO, $NO_2$, $N_2O_4$, $N_2O_5$ and $N_2O$ and is generally defined by the formula $NO_x$. The most important oxide is NO.

The term sulfur oxides, according to this invention, includes $SO_2$ and $SO_3$ and is defined by the formula $SO_x$.

BACKGROUND OF THE INVENTION

In the most widely used processes for removal of nitrogen oxides, nitrogen oxides are reduced to nitrogen with ammonia as the reducing agent. The reaction proceeds according to the equations indicated below:

$$6NO + 4NH_3 \rightarrow 5N_2 + 6H_2O \tag{1}$$

or, if $O_2$ is present in the exhaust gas:

$$4NO + 4NH_3 + O_2 \rightarrow 4N_2 + 6H_2O \tag{2}$$

DESCRIPTION OF THE RELATED ART

Examples of such processes are described in the German patent application Nos. 2458888, 2539003, 2603910, 2705901, 2832002 and 3031286. As catalysts for these reduction processes with $NH_3$, only iron base or copper oxide base catalysts are used. Since $SO_x$ transforms such catalysts into the corresponding sulfates, with concomitant deactivation or even mechanical destruction of the catalysts, $SO_x$ stable catalysts have been proposed and employed. These are, as a rule, catalysts on a support material stable to $SO_x$. e.g. titanium dioxide base promoted with additions of vanadium pentoxide, chromium trioxide, molybdenum trioxide, tungsten trioxide and similar substances.

A serious disadvantage of the reduction processes with $NH_3$ is that the $SO_2$ contained in the exhaust gases is oxidized to $SO_3$ and the latter then reacts with ammonia to ammonium bisulfate. The ammonium bisulfate deposits on the apparatus parts, resulting in mechanical clogging of the lines and of the connected heat exchangers.

Because of these disadvantages of the reduction processes with $NH_3$, an attempt has been made to reduce the $NO_x$ contained in the exhaust gases with the aid of hydrogen, carbon monoxide or methane as reduction gases at temperatures of more than 300° C. (cf. for example DE-OS No. 24 33 479). As catalysts for this reaction there have been used copper base catalysts promoted with elements from the groups of the alkali and/or alkaline earth and/or transition metals with a lower content of noble metal, preferably rhodium and/or ruthenium, on aluminum oxide as support material. The use of copper as a catalyst component was regarded as essential.

This process, however, has not found widespread commercial acceptance because the use of reduction gases, in particular hydrogen, presents considerable transportation and storage problems, as these gases must be kept under pressure.

DE-OS No. 25 39 346 teaches further a process for the removal of nitrogen oxides from gas mixtures, e.g. from combustion exhaust gases, by catalytic reduction, where aliphatic alcohols with 1 to 10 carbon atoms are used as reduction agents. The preferred reduction agent is methanol. The reduction is carried out at temperatures of about 250° to 450° C. Catalysts include, among others, metals of the platinum group, in particular iridium, on a support material, such as alumina.

It was found, however, that during the reduction of the nitrogen oxides with methanol in the presence of $SO_2$, $H_2S$ is formed, which greatly impairs the activity of the catalyst. In addition, as the methanol decomposes, there are formed with the usual $NO_x$ reduction catalysts formaldehyde, formic acid and dimethyl ether as undesirable byproducts, which likewise deactivate the catalyst in long-term operation and pollute the environment.

SUMMARY OF THE INVENTION

It is the object of the invention to make available a process of the type initially defined which will eliminate the problems connected with the transportation and storage of compressed gases and which with respect to the reduction agents used can be adapted easily and quickly to the conditions prevailing in the exhaust gas and which does not lead to undesired secondary reactions and impairments of the catalyst. According to this invention, the problem is solved in that a substantially methanol-free gas mixture obtained by catalytic conversion of methanol by way of dissociation or by steam reforming of methanol is mixed with the exhaust gases, and the mixture obtained is passed over a catalyst whereby the nitrogen oxides are reduced to nitrogen.

BRIEF DESCRIPTION OF THE DRAWING

The drawing represents a schematic process flow design for the purification of power plant exhaust gases.

DESCRIPTION OF THE PREFERRED EMBODIMENT

The conversion of methanol to produce a reducing gas mixture has the advantage that unlike compressed gases it can easily be transported and stored. The gas mixture obtained either by dissociation or by steam reforming can be varied in its composition, whereby a simple adaptation of the reduction process to the respective conditions prevailing in the exhaust gas (varying content of $NO_x$, $SO_x$ and oxygen; different temperatures) is possible. As the reducing gas mixture is essentially free of methanol, no competing and secondary reactions can occur over the $NO_x$ reduction catalyst.

The catalytic dissociation of the methanol occurs according to the equation:

$$CH_3OH \rightarrow CO + 2H_2 \tag{3}$$

the catalytic steam reforming according to the equation:

$$CH_3OH + H_2O \rightarrow CO_2 + 3H_2 \tag{4}$$

It is thus seen that by varying the molar ratio between methanol and $H_2O$, the ratio between the gaseous reaction products CO and H₂ used for the reduction of $NO_x$ can be varied within wide limits. Preferably one uses for the steam reforming a molar ratio between methanol and H₂O of about 1-5:1. Also, for the methanol dissociation, a certain H₂O content is desirable, to avoid carbon depositions on the catalyst (molar ratio $H_2O:CH_3OH = 0.05-0.2:1$).

For the dissociation or steam reforming of the methanol, known catalysts may be used, for example noble metal supported catalysts, in which the supports are on titanium dioxide, zirconium dioxide or cerium dioxide, or respectively copper-containing catalysts.

It is especially preferred to use as reforming catalyst a catalyst which contains:

(A) a metal component from one or more elements of the VIIIb group of the Periodic Table on a support material on the basis of (B₁) $TiO_2$ or $CeO_2$, singly or in admixture with other refractory metal oxides and/or hydraulic binders, or (B₂) $TiO_2$ which is applied on the surface of a preformed refractory material of $Al_2O_3$ or ceramic.

Such a catalyst is the object of German patent application No. P 33 40 569.7 and corresponding U.S. application Ser. No. 665,757. The metal component of this catalyst represents preferably one or more noble metals, in particular platinum and/or palladium and/or rhodium. The noble metal concentration is preferably 0.03 to 3 wt.%, in particular 0.15 to 0.5 wt.%, referred to the total catalyst. As refractory metal oxides, the catalyst contains preferably $Al_2O_3$ and/or $Cr_2O_3$, and as hydraulic binder calcium-aluminate cement, the concentration of these additions being 2 to 50 wt.%, in particular 5 to 25 wt.%, referred to the total catalyst.

The catalyst can be obtained in that compacts are produced from $TiO_2$ or $CeO_2$, if desired with other refractory metal oxides, these being calcined and impregnated with the metal component. Hydraulic binder and water may be added to the titanium dioxide to produce compacts which are thereafter dried and calcined and impregnated with the metal component. Also lubricants, such as aluminum stearate and/or graphite, may be added to the compacting composition.

According to another embodiment, this catalyst can be produced by application of $TiO_2$ on the surface of a preformed refractory material, such as $Al_2O_3$ or ceramic, the compact thus treated being thereafter calcined and impregnated with the metal component. The $TiO_2$ is applied preferably by impregnating the compact with alkoxytitanates, followed by hydrolysis and calcining. The compacts are preferably preformed spheres, tablets, rings or honeycombs of $Al_2O_3$ or ceramic. The impregnation with the metal component is carried out preferably with the use of water-soluble noble metal salts, in particular $H_2PtCl_6$ or $(NH_4)_2PtCl_6$ or the corresponding Pd or Rh salts. The calcining of the support material impregnated with the metal components is preferably carried out at temperatures between 450° and 650°, in particular between 550° and 640° C.

The above described catalyst makes it possible to carry out the conversion of the methanol either under the conditions of methanol dissociation (equation 3) or under the conditions of methanol steam reforming (equation 4), only the proportion of the added steam being varied. The catalyst is stable under different process conditions and does not tend to coke under the conditions of the reaction according to equation 3.

The dissociation or steam reforming of the methanol is carried out preferaby at temperatures in the range from about 400° to 600° C. The space velocities are generally in the range of about 0.5 to 20 liters/h × liters catalyst (referred to the water-containing methanol).

The reduction of the nitrogen oxides takes place (using NO, for purposes of illustration as the most frequently occurring nitrogen oxide) according to the equations:

$$2NO + 2H_2 \rightarrow N_2 + 2H_2O \qquad (5)$$

$$2NO + 2CO \rightarrow N_2 + 2CO_2 \qquad (6)$$

For the reduction, according to the invention, two variants enter into consideration.

According to the first variant, the reduction of the nitrogen oxides can be carried out with known catalysts at temperatures in the range of about 300° to 500° C. Normally one uses as catalysts noble metal catalysts, in particular rhodium-containing supported catalysts, aluminum oxide being commonly used as support material. The catalysts may also contain copper, as stated for example in DE-OS No. 24 33 479.

According to the second variant, the reduction of the nitrogen oxides is carried out with a noble metal supported catalyst which contains on an inert substrate an intermediate layer of gamma aluminum oxide, a silicon dioxide or an aluminum silicate, optionally in admixture with an oxide of lanthanum and/or of the lanthanides. Additionally, one or more noble metals from the group ruthenium, rhodium, palladium and/or platinum may be incorporated in this layer.

The term "silicon dioxide" is defined, according to this invention, as $SiO_2$ as well as highly condensed silicic acid with varying water contents, as obtained for example by drying and calcining of silica sols. These silica sols contain colloidal, amorphous $SiO_2$ in concentrations up to 60 wt.% (cf. Römpps Chemie-Lexikon, 8th edition, 1983, page 2108/2109).

The term "aluminum silicate" is defined, according to this invention, as compounds with different proportions of $Al_2O_3$ and $SiO_2$. Compounds in which aluminum occupies lattice sites instead of silicon are called alumosilicates. The aluminum silicates can be obtained for example by conversion of silica sols and alumosols, it being possible to obtain products with varying water contents according to the temperatures employed during the conversion or during the calcining. The term "alumosol" is here used in analogy to the term "alumogel" for an aqueous dispersion of aluminum hydroxides of varying composition (ratio $Al_2O_3:H_2O$).

The term "inert substrate" as used herein is defined as support materials, having a specific BET surface of less than 50 m²/g, preferably less than 25 m²/g, which preferably do not form sulfates with the sulfur oxides present in the exhaust gases. Preferably the proportion of pores of a diameter of more than 25 nm is more than 50% in these low surface area inert substrates. Examples for inert substrates suitable for the process according to the invention include alpha-aluminum oxide, titanium dioxide, ceramic materials and aluminum-magnesium silicates, or mixtures of these substances.

By the application of the intermediate layer onto the inert substrate, the favorable mechanical properties and favorable pore structure of the inert substrate are preserved. On the other hand, the favorable activity properties of the gamma aluminum oxide as support for the noble metals are preserved.

By means of the new catalysts it is possible to carry out the reduction of the nitrogen oxides at temperatures below 300° C. In particular, the reduction can be carried out in the range of about 180° to 300° C.

Further, it is possible with the aid of the new catalysts to carry out the reduction of the nitrogen oxides in the presence of an oxygen-containing mixture of exhaust gas and gaseous reduction agent. It was found, surprisingly, that by means of these catalysts, in particular in the temperature range below 300° C., the oxygen contained in the reaction mixture reacts only in small part with the hydrogen or carbon monoxide of the reduction gas. What occurs, therefore, is a selective reduction of the nitrogen oxides. This result is of particular economic importance, as the flue gases contain up to 10%, normally 3 to 6% oxygen. Also, in the presence of sulfur oxides, a selective reduction of $NO_x$ takes place. Further, it was found that the nitrogen oxides present are not reduced to ammonia, even if the reducing gases have a high hydrogen content.

The proportion of intermediate layer material in the total catalyst is generally 0.1 to 15 wt.%, preferably about 1.0 to 10 wt.%.

The noble metal concentration is generally about 0.05 to 1 wt.%, preferably 0.2 to 0.6 wt.%, referred to the total catalyst.

Due to its relatively high low-temperature activity and selectivity, the new catalyst can be arranged directly before the exhaust gas stack, whereby the capital investments are lowered, since at this point there is usually still space for the installation of new plant parts and the reactor materials need not meet such stringent requirements because of the lower temperatures.

Also, the sulfur oxides are usually largely removed from the exhaust gases at this point, thereby eliminating the burdens on the catalyst caused by the sulfur oxides. Hence the reduction of the nitrogen oxides is with an exhaust gas whose sulfur dioxide content has been reduced in a preceeding purification stage to less than about 200 ppm.

According to both process variants, a molar ratio between hydrogen and nitrogen oxides ($H_2:NO_x$) of about 10 to 2:1 and preferably about 3 to 6:1 is used whether the hydrogen is obtained from catalytic decomposition or from steam reforming of methanol.

The invention is explained below with reference to the drawing which represents a schematic flow design for the purification of power plant waste gases with the use of $NO_x$ low-temperature catalysts.

The waste gases first pass through line 1 into a dust separator 2. A certain portion of the sulfur oxides is bound to the alkaline dust particles in this step of the process. The waste gases, largely freed of the dust, pass from dust separator 2 into a heat exchanger 3, in which they are cooled to the temperature required for conversion of $NO_x$. The conversion of the waste gases occurs in the reactor 4, which is filled with the catalyst 5, on which the reduction of the nitrogen oxides to elemental nitrogen takes place.

The purified waste gases leave the reactor 4 through the line 6.

The reducing agents required for the reduction of $NO_x$ are introduced into the reactor 4 as follows:

From a storage tank 7 methanol is conveyed via line 8 into the reactor 9 which is filled with a catalyst 10 for dissociation (reaction 3) or steam reforming (reaction 4). If the catalyst 10 is to operate under the conditions of steam reforming, steam is introduced via line 11 in the required ratios. The reaction gases from reactor 9 pass via a line 12 into the reactor 4, where they are reacted with the nitrogen oxides.

The invention is explained still further by the following examples:

EXAMPLE 1

A power plant exhaust gas containing about 700 ppm NO, $CO_2=15\%$, $H_2O=10\%$, $O_2=0.4\%$, $SO_2=700$ ppm, balance $N_2$ was treated in reactor 4 at about 450° C. with a reduction gas obtained by catalytic steam reforming of methanol (about 3 parts by volume $H_2$ and 1 part by volume $CO_2$). As catalyst 5 in reactor 4, a Rh-Cu-MgO-$Al_2O_3$ catalyst with 0.05% Rh was used. The space velocity is about 3000 liters waste gas/h liter catalyst.

The reduction gases were added to the exhaust gas in quantities of 0.7 vol.%, so that the resulting mixture contained about 0.28 vol.% $H_2$. After passage through the catalyst 5, the waste gas had a $NO_x$ content of <150 ppm.

The reduction gases were prepared as follows:

Methanol from the reservoir 7 was passed through line 8 into the reactor 9 heated to 400° C. At the same time steam was introduced through line 11, the molar ratio $CH_3OH$ to $H_2O$ being 1:1. The catalyst 10 contained in reactor 9 had been prepared as follows:

A commercial $TiO_2$ (BET-SA*=45 $m^2$/g) was, after addition of 8 wt.% Al stearate, pressed to 4.5 mm tablets and these were heated in air to 640° C. for 8 hours, then maintained at 640° C. for 1 hour and thereafter cooled to ambient temperature again. These tablets were impregnated with an aqueous $H_2PtCl_6$ solution (at 25° C.), and the Pt-containing tablets were thereafter dried (120° C., 4 h) and recalcined at 400° C. (2 h). The catalyst thus obtained contained 0.3 wt.% Pt and had a BET surface of 40 $m^2$/g, a bulk density of 1426 g/l, a crusting strength of 17.3 kg, and a pore volume of 0.13 ml/g.

*specific surface area

After passage of the $CH_3OH/H_2O$ mixture through the catalyst, no methanol was detected in the reaction gases.

EXAMPLE 2

A flue gas containing about 200 ppm NO, $CO_2=12\%$, $H_2O=12\%$, $O_2=3\%$, $SO_x=600$ ppm, balance $N_2$, was treated in reactor 4 at a temperature of about 450° C. with a reduction gas which had been obtained essentially by catalytic dissociation of methanol, i.e. only 2% water were added to the methanol. The composition of the reduction gas (in vol.%) was as follows: $CO=28.5\%$, $H_2=65.1\%$, $CO_2=3.4\%$, $CH_3=3\%$. As catalyst 5 in reactor 4 there was used a catalyst which had been obtained by the addition of ammonium vanadate to metatitanic acid followed by calcining at 400° to 550° C. (atomic ratio Ti:V=94:6). The space velocity was about 3000 liters waste gas/h×liter catalyst.

The reduction gases were added to the flue gas in quantities of about 0.2 vol.%.

After passage through the catalyst 5 the flue gas had a NO content of <40 ppm.

The reduction gases were prepared as follows:

Methanol from reservoir 7 was passed through line 8 into the reactor 9 heated to 400° C. Simultaneously, steam in a quantity of 2 wt.% of the charged methanol was introduced through line 11. The catalyst in reactor 9 corresponded to the catalyst of Example 1.

The following examples explain the reduction of the nitrogen oxides with the new low-temperature catalysts. The production of these catalysts is indicated below.

PRODUCTION EXAMPLES

A. Production of the Supports:

Support T 1:

147.2 g Al(NO$_3$)$_3$.9H$_2$O were dissolved in distilled water and the solution was diluted to a volume of 245 ml. 200 g of an alpha Al$_2$O$_3$ support (tablets of 3.7 mm diameter and 3.5 mm height; BET surface=4.0 m$^2$/g; Hg pore volume=0.24 ml/g; water absorption capacity=0.25 ml/g) were immersed for 20 minutes in the aluminum nitrate solution heated to 70°–80° C. After drip draining of the excess solution, the tablets were calcined for 2 hours at 400° C., the aluminum nitrate transformed into gamma Al$_2$O$_3$. The support T 1 thus obtained contained 2.0% gamma-Al$_2$O$_3$, as coating.

Support T 2:

100 g of a commercial aluminum oxide hydrate were charged while stirring in 400 ml of a 1.2% HNO$_3$. 150 g alpha-Al$_2$O$_3$ tablets (as in T 1) were immersed in the resulting dispersion for 20 minutes. After drip draining of the excess dispersion, the tablets were calcined at 400° C. for 3 hours. The support T 2 thus obtained contained 2.1% gamma-Al$_2$O$_3$, as coating.

Support T 3:

132.5 g Al(NO$_3$)$_3$.9H$_2$O and 5.3 g La(NO$_3$)$_3$.6H$_2$O were dissolved in distilled water and the solution was dissolved to a volume of 245 ml. 150 g of an alpha-Al$_2$O$_3$ support (as in T 1) were immersed in the nitrate solution heated to 70°–80° C. as described under T 1, and thereafter calcined for 3 hours at 400° C. The resulting support T 3 contained 1.8% gamma-Al$_2$O$_3$ and 0.2% La$_2$O$_3$ as coating.

Support T 4:

132.5 g Al(NO$_3$)$_3$.9H$_2$O and 4.5 g nitrate mixture of the rare earths (upon thermal dissociation the nitrate mixture gives an oxide mixture, REO, with 60% La$_2$O$_3$, 15% CeO$_2$, 17.5% Nd$_2$O$_3$, 7.5% Pr$_6$O$_{11}$) were dissolved in distilled water and the solution was brought to a volume of 245 ml. 150 g of an alpha-Al$_2$O$_3$ support (as under T 1) were immersed for 20 minutes in the nitrate solution heated to 70°–80° C. and calcined at 400° C. for 3 hours after drip draining of the excess solution. The resulting support T 4 contained 1.8% gamma-Al$_2$O$_3$ and 0.2% REO as coating.

Support T 5:

147.2 Al(NO$_3$)$_3$.9H$_2$O were dissolved in distilled water and brought to a volume of 245 mol. 150 g of a cordierite support (2MgO.2Al$_2$O$_3$.5SiO$_2$; 4.0 extrudate with BET surface=0.5 m$^2$/g; water absorption=0.24 ml/g) were immersed for 20 minutes in the nitrate solution heated to 70°–80° C.; the product was calcined for 3 hours at 400° C. after drip draining of the excess immersion solution. The support T 5 thus obtained contained 2.1% gamma-Al$_2$O$_3$ as coating.

Support T 6:

150 g of a cordierite support (2MgO.Al$_2$O$_3$.5SiO$_2$; 4.0 mm extrudate with a BET-SA of 0.5 m$^2$/g; water absorption capacity=0.24 ml/g) were immersed for 20 minutes in a silica sol containing 10% SiO$_2$; the product was calcined for 3 hours at 400° C. after drip draining of the excess immersion solution. The support T 6 thus obtained contained 2.5% SiO$_2$ as coating.

Support T 7:

150 g of a cordierite support (as used for support T 6) were immersed in a mixture of equal parts of silica sol with 10% SiO$_2$ and alumo sol with 10% Al$_2$O$_3$ for 20 minutes; the product was calcined for 3 hours at 400° C. after drip draining of the excess immersion solution. The support T 7 thus obtained contained 1.2% SiO$_2$ and 1.2% Al$_2$O$_3$ as coating.

B. Production of the Catalysts:

Comparison Catalyst A:

100 g of a gamma-Al$_2$O$_3$ support (4×4 mm tablets with BET surface=181 m$^2$/g; Hg pore volume=0.16 ml/g; water absorption capacity=0.42 ml/g) were sprayed with a solution of 0.98 g rhodium-(III)-hydrochloride in 15 ml H$_2$O and dried and calcined as described under K 1. The physical and chemical data of the catalyst are given in Table I.

Catalyst K 1:

100 g of the support T 1 were sprayed uniformly with a solution of 0.98 g rhodium-(III)-hydrochloride (35.8% Rh) in 15 ml H$_2$O. Thereafter, the tablets were dried at 120° C. for 2 hours, then calcined at 200° C. for 1 hour and at 400° C. for 2 hours. The physical and chemical data of catalyst K 1 are given in Table I.

Catalyst K 2:

100 g of the support T 2 were coated with Rh, as described under K 1. The physical and chemical data of catalyst K 2 are given in Table I.

Catalyst K 3:

100 g of the support T 3 were coated with Rh as described under K 1. The physical and chemical data of catalyst K 3 are given in Table I.

Catalyst K 4:

100 g of the support T 4 were coated with Rh as described under K 1. The physical and chemical data of catalyst K 4 are given in Table I.

Catalyst K 5:

100 g of the support T 5 were coated with Rh as described under K 1. The physical and chemical data of catalyst K 5 are given in Table I.

Catalyst K 6:

100 g of the support T 1 were sprayed uniformly with a solution of 1.12 g ruthenium-(III)-hydrochloride (35.65% Ru) in 15 ml H$_2$O. Drying and calcining took place as described for catalyst K 1. The physical and chemical data of catalyst K 6 are given in Table I.

Catalyst K 7:

100 g of support T 6 were coated with Rh as described under K 1. The physical and chemical data of catalyst K 7 are given in Table I.

Catalyst K 8:

100 g of the support T 7 were coated with Rh as described under K 1. The physical and chemical data of catalyst K 8 are given in Table I.

EXAMPLES 3 TO 10

A model gas of the composition: NO=1000 ppm, SO$_2$=1000 ppm O$_2$=3 vol.%, H$_2$O=10 vol.%, balance N$_2$ was passed over the catalysts indicated in Table I in a test reactor at 240° C. with the reduction gas obtained by catalytic steam reforming of methanol according to Example 1. The space velocity was 3000 liters waste gas/h liter catalyst; the molar ratio between H$_2$ in the reaction gas and NO in the waste gas was 5:1.

The NO conversion attained with the individual catalysts are indicated in Table II.

Table II shows that the new catalysts K 1 to K 8 yield clearly higher NO conversions as against the comparison catalyst A. Also, it was found that the activity of the comparison catalyst A decreased faster in the long-term test than that of the new catalysts K 1 to K 8.

TABLE I
CHEMICAL AND PHYSICAL DATA OF THE CATALYSTS

| Catalyst | Main Component of the Intermediate Layer (%) | $La_2O_3$ (%) | REO (*) (%) | Rh (%) | Ru (%) | BET SA ($m^2/g$) | Pore Volume Hg Penetration (ml/g) |
|---|---|---|---|---|---|---|---|
| A | 100 gamma-$Al_2O_3$ | — | — | 0.35 | — | 180 | 0.16 |
| K 1 | 2.0 gamma-$Al_2O_3$ | — | — | 0.35 | — | 6.0 | 0.21 |
| K 2 | 2.1 gamma-$Al_2O_3$ | — | — | 0.35 | — | 6.0 | 0.20 |
| K 3 | 1.8 gamma-$Al_2O_3$ | 0.2 | — | 0.35 | — | 5.9 | 0.20 |
| K 4 | 1.8 gamma-$Al_2O_3$ | — | 0.2 | 0.35 | — | 6.0 | 0.21 |
| K 5 | 2.1 gamma-$Al_2O_3$ | — | — | 0.35 | — | 4.1 | 0.10 |
| K 6 | 2.0 gamma-$Al_2O_3$ | — | — | — | 0.40 | 6.1 | 0.21 |
| K 7 | 2.5 $SiO_2$ | — | — | 0.35 | — | 6.5 | 0.21 |
| K 8 | 2.5 $SiO_2Al_2O_3$ | — | — | 0.35 | — | 6.4 | 0.21 |

(*) REO = Oxide mixture of rare earths with 60% $La_2O_3$, 15% $CeO_2$, 17.5% $Nd_2O_3$, 7.5% $Pr_6O_{11}$

TABLE II
$NO_x$ REMOVAL WITH $H_2$ AS REDUCTION AGENT

| Example | Catalyst | Support | $NO_x$ Conversion (%) |
|---|---|---|---|
| 3 | K 1 | T 1 | 78 |
| 4 | K 2 | T 2 | 75 |
| 5 | K 3 | T 3 | 81 |
| 6 | K 4 | T 4 | 79 |
| 7 | K 5 | T 5 | 77 |
| 8 | K 6 | T 1 | 80 |
| 9 | K 7 | T 6 | 80 |
| 10 | K 8 | T 7 | 81 |
| Comparison ex. | A | gamma-$Al_2O_3$ | 72 |

K 1 = Rh (0.35%)
K 2 = Rh (0.35%)
K 3 = Rh (0.35%)
K 4 = Rh (0.35%)
K 5 = Rh (0.35%)
K 6 = Ru (0.40%)
K 7 = Rh (0.35%)
K 8 = Rh (0.35%)
A = Rh (0.35%)

T 1 = alpha-$Al_2O_3$ with 2% gamma-$Al_2O_3$ from $Al(NO_3)_3$
T 2 = alpha-$Al_2O_3$ with 2% gamma-$Al_2O_3$ from $Al(OH)_3$
T 3 = alpha-$Al_2O_3$ with 1.8% gamma-$Al_2O_3$ 0.2% $La_2O_3$
T 4 = alpha-$Al_2O_3$ with 1.8% gamma-$Al_2O_3$ 0.2% REO
T 5 = cordierite with 2% gamma-$Al_2O_3$
T 6 = cordierite with 2.5% $SiO_2$
T 7 = cordierite with 2.5% $SiO_2.Al_2O_3$

We claim:
1. Process for the removal of nitrogen oxides from exhaust gases, which comprises the steps of:
   A. passing methanol over a methanol conversion catalyst selected from the group consisting of catalytic noble metals supported on carriers comprising titanium dioxide, zirconium dioxide or cerium dioxide and a catalytic metal comprising copper oxide and producing a hydrogen-rich gas substantially free of methanol;
   B. passing said hydrogen-rich gas and exhaust gases containing nitrogen oxide over a supported noble metal nitrogen oxide reduction catalyst under conditions conductive to the reduction of nitrogen oxides to nitrogen and water vapor.
2. Process according to claim 1, wherein said methanol conversion catalysts contain:
   a metal component from one or more elements of Group VIII of the periodic table on a support material comprising
   A $TiO_2$ or $CeO_2$ or
   B $TiO_2$, which is applied on the surface of a preformed refractory material of $Al_2O_3$ or ceramic.
3. Process according to claim 1, comprising the further step of adding steam to the methanol in a molar ratio of between 5–1:1.
4. Process according to claim 1, in which the conversion of methanol is carried out at temperatures in the range of about 400° to 600° C.
5. Process according to claim 1, in which the reduction of the nitrogen oxides is carried out at temperatures in the range of from about 300° to 500° C.
6. Process according to claim 1, wherein the noble metal of the nitrogen oxide reduction catalyst is selected from the group consisting of ruthenium, rhodium, platinum and palladium.
7. Process according to claim 6, wherein the noble metal is selected from the group consisting of ruthenium, rhodium, platinum and palladium.
8. Process according to claim 1, in which the nitrogen oxide reduction catalyst comprises:
   A. a noble metal selected from the group consisting of ruthenium, rhodium, palladium and platinum;
   B. a low surface area inert carrier substrate coated with a higher surface area layer of carrier material.
9. Process according to claim 8, in which said high surface area layer is gamma alumina.
10. Process according to claim 8, in which said high surface area layer is silica.
11. Process according to claim 8, in which said higher surface area layer is an aluminum silicate.
12. Process according to claim 8, in which said higher surface area layer also contains an oxide of the lanthanoide group of the Periodic Table.
13. Process according to claim 8, in which the low surface inert carrier substrate is selected from the group consisting of alpha aluminum oxide, titanium oxide, a ceramic material and aluminum-magnesium silicate.
14. Process according to claim 8, in which the inert carrier substrate has a specific surface of less than 50 $m^2/g$ and the proportion of pores of a diameter of more than 25 nm is more than 50%.
15. Process according to claim 8, in which the proportion of intermediate layer of higher surface area material in the total catalyst is about 0.1 to 15% by weight.
16. Process according to claim 8, in which the noble metal concentration of the catalyst is about 0.01 to 1 percent by weight, by reference to the total catalyst.
17. Process according to claim 8, in which the temperature for reduction of the nitrogen oxides is below 300° C.
18. Process according to claim 17, in which the reduction of the nitrogen oxides is carried out at a temperature in the range of from 180° to 300° C.
19. Process according to claim 1, in which the molar ratio of hydrogen and nitrogen oxides is about 10 to 2:1.
20. Process according to claim 2, wherein $TiO_2$ or $CeO_2$ of component $A_1$ are in admixture with a hydraulic binder.
21. Process according to claim 12, in which said oxide of the lanthanoide group of the periodic table is an oxide of a lanthanum.

* * * * *

UNITED STATES PATENT AND TRADEMARK OFFICE
CERTIFICATE OF CORRECTION

PATENT NO. : 4,585,632

DATED : April 29, 1986

INVENTOR(S) : Michael Schneider, Karel Kochloefl, Ditmar Prigge

It is certified that error appears in the above-identified patent and that said Letters Patent is hereby corrected as shown below:

On the Title Page:

Item [75] Inventors: Should read --Michael Schneider, Ottobrunn Riemerling; Karel Kochloefl, Moosburg; and Ditmar Prigge, Munich, all of the Federal Republic of Germany--.

Column 9, line 54, "conductive" should read --conducive--.

Signed and Sealed this

Seventh Day of April, 1987

Attest:

DONALD J. QUIGG

Attesting Officer

Commissioner of Patents and Trademarks